(12) United States Patent
Krantz (10) Patent No.: US 12,014,646 B2
(45) Date of Patent: Jun. 18, 2024

(54) SYSTEM, DEVICE AND METHOD FOR PREVENTING HAND-TO-FACE CONTACT

(71) Applicant: Michael Krantz, Long Beach, CA (US)

(72) Inventor: Michael Krantz, Long Beach, CA (US)

( * ) Notice: Subject to any disclaimer, the term of this patent is extended or adjusted under 35 U.S.C. 154(b) by 27 days.

(21) Appl. No.: 16/851,366

(22) Filed: Apr. 17, 2020

(65) Prior Publication Data

US 2022/0375364 A1    Nov. 24, 2022

(51) Int. Cl.
*G09B 19/00* (2006.01)
*G08B 21/02* (2006.01)

(52) U.S. Cl.
CPC ......... *G09B 19/0076* (2013.01); *G08B 21/02* (2013.01)

(58) Field of Classification Search
CPC .............................. G09B 19/0076; G08B 21/02
USPC ...................................................... 434/236
See application file for complete search history.

(56) References Cited

U.S. PATENT DOCUMENTS

| 8,923,804 | B1* | 12/2014 | Aldridge, II | ............ | H04W 4/16 |
| | | | | | 455/404.1 |
| 2011/0144453 | A1* | 6/2011 | Kovarik | ............... | A61B 5/6893 |
| | | | | | 600/300 |
| 2016/0140830 | A1* | 5/2016 | Hathorn | ................. | G08B 21/18 |
| | | | | | 340/686.6 |
| 2017/0124276 | A1* | 5/2017 | Tee | .................... | G08B 21/0446 |
| 2018/0027908 | A1* | 2/2018 | Greenly | ............... | A61B 5/6826 |
| 2021/0233378 | A1* | 7/2021 | Murati | ................. | G08B 21/245 |
| 2021/0248890 | A1* | 8/2021 | Shaw | ................... | G08B 21/182 |

* cited by examiner

*Primary Examiner* — Robert P Bullington
*Assistant Examiner* — Stephen Alvesteffer
(74) *Attorney, Agent, or Firm* — Richard B. Cates (57) ABSTRACT

A system, device, and method for discouraging a user from making hand-to-face contact. The system and device includes at least one hand component and at least one head/face component. The system and device monitor to determine if the hand component is within a selected distance of the head/face component. When the hand component is brought with a selected warning distance of the head/face element, indicating that the user is bringing his/her hand toward the user's face, a warning alarm is activated which cautions the user to cease moving the hand toward the face.

8 Claims, 4 Drawing Sheets

SYSTEM, DEVICE AND METHOD FOR PREVENTING HAND-TO-FACE CONTACT

FIELD OF THE INVENTION

The present invention relates to behavior modification, and, more particularly, to systems and methods and devices for preventing hand-to-face contact.

BACKGROUND OF THE INVENTION

It is very common for an individual to touch his/her hand to his/her face. People regularly rub their eyes, noses, and mouths during the course of the day.

Hand-to-face contact is a common route for disease transmission. Colds, flu, and other diseases can easily be transmitted when a person touches an infected surface (such as a doorknob which contains bacteria or viruses deposited there by another person who was infected with the bacteria/virus), and then the first person touches his/her now-infected hand to his/her eyes, nose, or mouth.

Even a person who is diligent in trying to remember not to make hand-to-face contact may accidentally make such contact. For example, the person may momentarily forget about avoiding such contact, and may give in to the natural impulse to make hand-to-face contact.

What is desired is for a feedback system and method which provides feedback to warn and prevent a user from touching the user's face with the user's hands, with the feedback provided by components which are comfortable and unobtrusive for a user to use and wear.

There is presently a need for improved devices and methods for preventing hand-to-face contact. The current invention fulfills this need.

SUMMARY OF THE INVENTION

The present invention provides devices and methods for preventing hand-to-face contact. The present invention provides a device that will present a warning to a user when the user is moving the user's hand toward the user's face.

A system of the invention for training a user to avoid hand-to-face contact has a hand element adapted to be secured to a hand of the user, a head element adapted to be secured to a head of the user, a proximity element adapted to determine if the hand element is within a selected distance of the head element; and a warning element adapted to provide a warning signal responsive to the proximity element determining that the hand element is within the selected distance of the head element. The hand element may be in the form of a ring adapted to be worn on a finger of the hand of the user; in the form of a wristwatch of bracelet adapted to be worn on a wrist of the hand of the user; in the form of an artificial fingernail adapted to be secured to a natural fingernail of the hand of the user; etc.

A head element may be in the form of an earring or part thereof adapted to be worn on an ear of the user; in the form of eyeglasses adapted to be worn on the head of the user; in the form of a hat or earphone set adapted to be worn on the head of the user; in the form of a necklace adapted to be placed on and worn around the neck of the user; etc.

Various methods and elements may be used to determine the distance between hand components and head components. Any such methods and elements known in the art for determining distance between components/proximity sensing could be used with the systems devices and methods herein without departing from the current invention. For example, a hand element or a head element may have a magnet adapted to generate a magnetic field, and the other of the head element or the head element may have a magnetic field detector adapted to detect characteristics of the magnetic field. A proximity element may have and use a processor to process the detected characteristics of the magnetic field to thereby determine if the hand element is within a selected distance of the head element.

The hand element or the head element may have a transmitter adapted to transmit a signal, and the other of the hand element or the head element may be adapted to receive the transmitted signal and return a different signal, such as a modification of the transmitted signal, back to the transmitter. The proximity element may have a processor adapted to process the received different/modified signal to thereby determine if the hand element is within a selected distance of the head element. For example, the transmitted signal from the hand element or the head element may activate an RFID chips which is part of the other of the hand element or the head element. The RFID chip, when activated by the transmitted signal, generates a different signal which can indicate the proximity of the head element to the hand element. The different/modified signal may be returned toward the hand element or head element which generated the original transmitted signal, where it is received by a receiver and can be used by a proximity element to determine if a hand element is within a selected distance of a head element, and/or may be used to activate a warning element adapted to provide a warning signal.

The hand element or the head element may have a transmitter adapted to transmit a signal, and the other of the head element or the head element may have a receiver adapted to receive the signal. The proximity element may have a processor adapted to process the received signal to thereby determine if the hand element is within a selected distance of the head element.

A system of the invention may further have a second hand element adapted to be secured to a second hand of the user; and/or may have a second head element adapted to be secured to the head of the user. The system may also have a second proximity element adapted to determine if the second hand element is within the second selected distance of the second head element, and/or may have a second warning element adapted to provide a second warning signal responsive to the second proximity element determining that the second hand element is within the second selected distance of the second head element.

A method of the invention for preventing a user from touching one or both hands of the user to a head of the user may have various steps, including: providing one or more hand elements adapted to be secured to a first and/or second hand of the user; providing one or more head elements adapted to be secured to a head of the user; wherein a hand element or a head element comprises a proximity element adapted to determine if the hand element is within a selected distance of the head element, and the hand element or the head element comprises a warning element adapted to provide a warning signal responsive to the proximity element determining that the hand element is within the selected distance of the head element, and wherein the method may further comprise: positioning the hand element on or adjacent a hand of the user; positioning the head element on or adjacent the head of the user; determining if the hand element is within the selected distance from the head element; and if the hand element is within the selected distance from the head element, activating the warning element to provide the warning signal. The proximity element may have a signal transmitter and a signal receiver, and determining if the hand element is within the selected distance from the head element may involve transmitting a first signal from the signal transmitter, receiving a returned signal with the signal receiver, using characteristics of the returned signal to calculate an estimated distance between the hand element and the head element; and comparing the estimated distance to the selected distance.

The proximity element of the hand element or the head element may have a magnetic field detector, and the other of the hand element or the head element may have a magnet adapted to generate a magnetic field. Determining if the hand element is within the selected distance from the head element may involve generating a magnetic field with the magnet, detecting characteristics of the magnetic field using the magnetic field detector, using the detected characteristics of the magnetic field to calculate an estimated distance between the hand element and the head element, and comparing the estimated distance to the selected distance.

One or more hand elements may be in the form of a ring adapted to be placed on a finger of the user, and positioning the hand element on or adjacent a hand of the user may involve placing the ring on a finger of the user. One or more hand elements may be in the form of an artificial fingernail adapted to be placed on a natural fingernail of the user, and positioning the first hand element on or adjacent a hand of the user may involve placing the artificial fingernail on a natural fingernail of the user. One or more hand elements may be in the form of a wristwatch or bracelet adapted to be placed on a wrist of the user, and positioning the hand element on or adjacent a hand of the user may involve placing the wristwatch or bracelet on a wrist of the user.

One or more head elements may be in the form of an earring adapted to be placed on a ear of the user, and positioning the first head element on or adjacent the head of the user may involve placing the earring on an ear of the user. One or more head elements may be in the form of eyeglasses adapted to be placed on the face of the user, and positioning the head element on or adjacent the head of the user ma involve placing the eyeglasses on the face of the user. One or more head elements may be in the form of a necklace adapted to be placed around a neck of the user, and positioning the head element on or adjacent the head of the user may involve placing the necklace around the neck of the user. One or more head elements may be in the form of a hat or set of headphones adapted to be placed on the head of the user, and positioning the head element on or adjacent the head of the user may involve placing the hat or set of headphones on the head of the user.

Systems of the invention may incorporate smartphone technology, which may include having hand and/or head/face elements communicating with a user's smartphone. Such systems may be in active communication via wireless network with internet or similar outside information sources, and/or to actively monitor the user's location (e.g., via GPS) and/or actively monitor the relative risk of infection of the user's location. The system may be adapted to automatically update the relative risk of infection of particular locations and/or particular types of business and/or regions such as by using internet-provided information for such updates/changes, and/or be adapted to permit a user to update/change the relative risk of infection of particular locations and/or types of business and/or regions. A user can activate such a system by turning it on or off, such as via the smartphone; and change system settings such as warning distances, warning types/levels/intensities, and/or location risk settings.

It should be understood that each of the system elements disclosed herein can be used with any and all of the other elements disclosed herein, even though the specific combination of an element with other elements may not be explicitly shown in the figures herein. In other words, based on the explanation of the particular device, one of skill in the art should have little trouble combining the features of certain of such devices. Therefore, it should be understood that many of the elements are interchangeable, and the invention covers all permutations thereof.

An importance feature of the invention is that the system/device elements are relatively small and can be used without interfering with normal movement, and also without being unduly visible to others.

Other objects, features, and advantages of the present invention will become apparent from a consideration of the following detailed description.

DETAILED DESCRIPTION OF SEVERAL EMBODIMENTS

Figure 1:
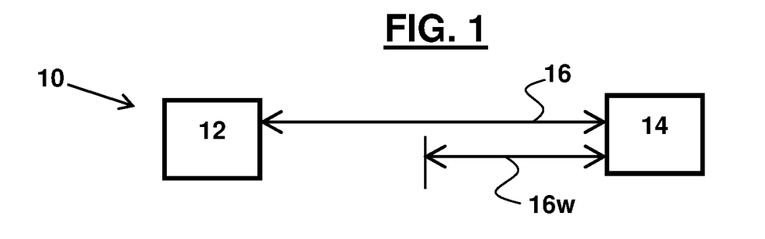
FIG. 1 depicts a schematic view of a hand-to-face warning system according to an embodiment of the invention.

A system 10 according to an embodiment of the invention as depicted in FIG. 1, which include at least one hand component 12 and at least one head/face component 14. In the particular system 10 depicted, there is one hand component 12 and one head/face component 14. Each hand component 12 may be adapted to be secured to or adjacent a hand of a user. Each head/face component 14 may be adapted to be secured to a user at or adjacent the user's head and/or face. The hand component 12 is separated from the head component 14 by a distance 16. The hand component 12 can be secured to a user's hand, and the head/face component 14 can be secured to the user's head/face. As a user moves the respective hand around with respect to the user's face/head, the distance 16 will vary. When the distance 16 is at or below a selected warning distance 16w, a warning is provided which indicates to the user that the respective hand is too close to the user's head/face.

The warning distance 16w may be pre-programmed into the system, and/or may be adjustable by the user. For example, the system may be adapted to permit a user to vary the warning distance 16w, such as by activating a dial or other control by which the warning distance 16w can be controlled/adjusted. Examples of warning distances of the invention can include 10-12 inches, 8-10 inches, 6-8 inches, 4-6 inches, 2-4 inches, 2 inches or less, etc. A user may initially set the warning distance 16w to a relatively low value, such as 4 inches, and then as the user becomes more familiar with the system the user can increase the warning distance, such as to 8 or 10 or 12 inches. The user can thus train himself/herself to be in the habit of keeping the user's hands further and further from the user's face.

Figure 2:
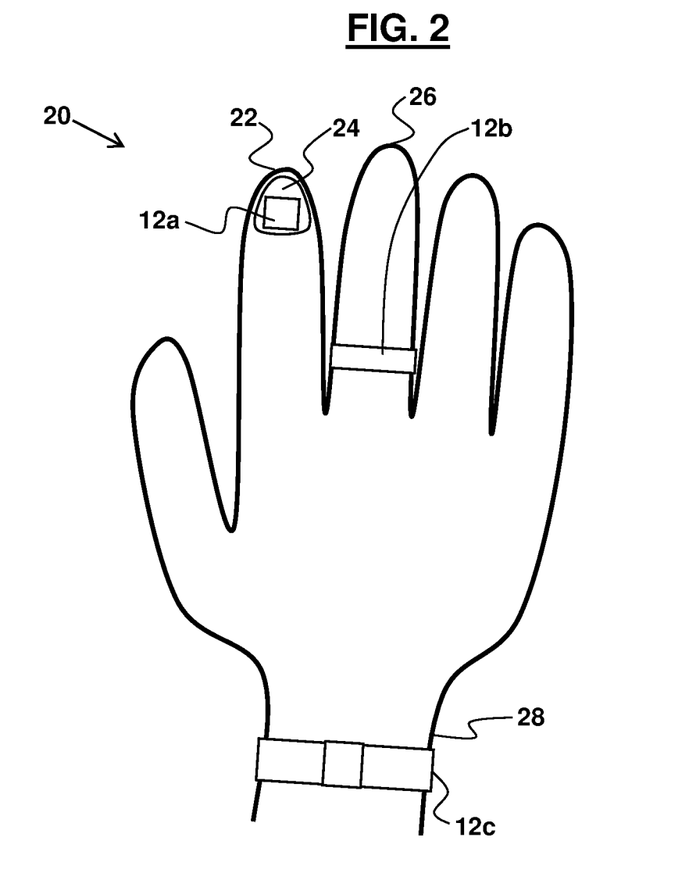
FIG. 2 depicts a top view of a user's hand with components of the system thereon.

One or more hand components 12a, 12b, 12c may be adapted to be secured to or adjacent a hand 20 of a user. Examples include a hand component 12a adapted to be secured to a fingertip 22, such as on a fingernail 24 (e.g., in the form of an artificial fingernail adapted to be secured to a natural fingernail 24 of a user), which may be secured via adhesive such as pressure-sensitive adhesive. A hand component 12b may be adapted to be worn on the finger 26 (e.g., in the form of a ring adapted to be worn on the finger 26 of the user). A hand component 12c may be adapted to be worn on the wrist 28. For example, the hand component 12c may be in the form of a bracelet or wristwatch adapted to be worn on the wrist of a user, or may be in the form of a component adapted to be secured (e.g., releasably secured, such as in a comfortable and non-obtrusive manner) to a bracelet and/or wristwatch of a user. Note that a system of the invention may include any combination of one or more hand components, including any combination of different components, or combinations of multiple components, such as components 12a, 12b, 12c. For example, a system may include one or more fingertip hand components 12a in the form of stick-on elements on fingernails 24, and also include one or more wrist hand components 12c adapted to be worn on one or both wrists 28 of the user. In another example, a system may include a finger hand component 12b in the form of a ring worn on one of the user's hands, and a wrist hand component 12c in the form of a wristwatch worn on the other of the user's hands.

Figure 3:
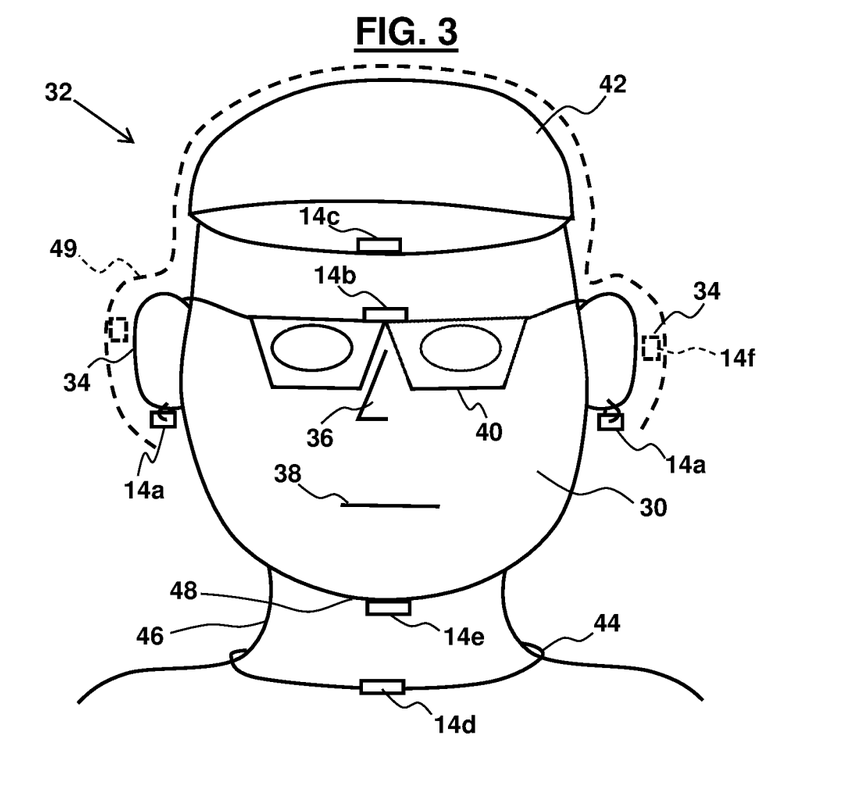
FIG. 3 depicts a front view of a user's head with components of the system thereon.

One or more head/face components 14a, 14b, 14c, 14d, 14e, 14f may be adapted to be secured at or adjacent one or more portions of a user's face 30 and/or other portion of the user's head 32. Examples include a head/face component 14a adapted to be secured to a user's ear 34 (e.g., in the form of an earring), or to the user's nose 36, and/or to the user's mouth 38. A head/face component 14b may be adapted to be worn on a user's head 32 in the form of a pair of eyeglasses 40, and/or may be adapted to be secured to a pair of eyeglasses worn by a user. A head/face component 14c may be adapted to be worn on a user's head 32 in the form of a portion of a hat 42, and/or may be adapted to be secured to a hat worn by a user, such as being adapted to be clipped or otherwise secured to a baseball-style hat, such as on the brim of a baseball cap, etc. A head/face component 14d may be adapted to be worn as a necklace 44, or as part of necklace, or to be secured to a necklace, with the necklace being worn around the user's neck 46. A head/face component 14e may be adapted to be worn as a stick-on bandage or similar stick-on structure, with the stick-on bandage being applied to a selected part of the user's head 32, such as under the user's chin 48. A head/face component 14f may be adapted to be worn as a set of headphones 49, or as part of a set of headphones, or to be secured to a set of headphones, with the set of headphones being worn around the user's head 32 and over the ears 34.

Note that a system of the invention may include any combination of one or more head/face components, including any combination of different components such as components 14a, 14b, 14c, 14d, 14e, 14f. For example, a system may include one or two head/face components 14a in the form of earrings adapted to be worn on each ear 34, and/or also include a head/face component 14d in the form of a necklace adapted to be worn around a user's neck 42, etc.

Figure 4:
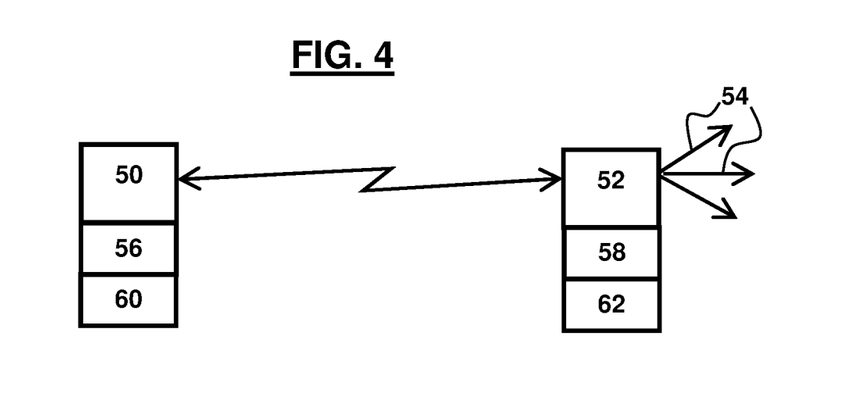
FIG. 4 depicts a schematic view of components of a hand-to-face warning system according to an embodiment of the invention.

As depicted in the schematic of FIG. 4, the system 10 has a proximity detection component 50 that is adapted to determine if the hand component 12 is brought within a selected warning distance 16w of the head/face component 14. The system 10 also includes a warning component 52 that provides a warning signal 24 responsive to the proximity detection component determining if a hand component has been brought within the selected warning distance 16w. The proximity detection component 50 may include a power source 56 such as a battery, which may be a rechargeable battery. The warning component 52 may include a power source 58 such as a battery, which may be a rechargeable battery. The proximity detection component 50 and warning component 52 may share a common power source.

If a user moves his/her hand within the selected warning distance 16w to the user's face, the warning component 52 provides the warning signal 54. This warning signal 54 serves as a deterrent to the user touching his/her face, such as touching the user's hand to the user's mouth, nose, or eyes.

Warning component 52 may comprise a speaker, light, or vibration element, and may provide a warning signal 54 in the form of an audible, visible, and/or tactile signal, respectively. Examples of a warning signal 54 include a warning sound such as a continuous or intermittent (e.g., beeping) sound; a steady or flashing light; a steady or intermittent vibration; or any combinations of such signals. The warning signal 54 may vary according to how close a hand element is brought toward a face/head element. For example, the warning signal in an audible form may start at a relatively low sound level or low repetition rate when a separation distance 16 reaches the selected warning distance 16w, with the volume and/or repetition rate increasing as the separation distance 16 falls further below the warning distance 16w. The warning signal in a vibration form may start at a relatively low intensity and/or pulse rate when a separation distance 16 reaches the selected warning distance 16w, with the vibration intensity and/or pulse rate increasing as the separation distance 16 falls further below the warning distance 16w.

The proximity detection component 50 may have a proximity warning distance control 60, such as a dial or other control with which the user can set/change the warning distance 16w. For example, a first-time user may desire a smaller warning distance 16w when first using the system/method of the invention, and may then use the proximity warning distance control 60 to adjust the warning distance 16w to a larger distance. For another example, a first-time user may desire a larger warning distance 16w when first using the system/method of the invention, and may then use the proximity warning distance control 60 to adjust the warning distance 16w to a smaller distance. A user may use the proximity warning distance control 60 to adjust the warning distance 16w to be particularly large when the user is heading into a place or situation where there is a greater risk of virus/bacteria exposure, and then to reduce the warning distance 16w when the user is in a lower risk area/situation.

The warning component 52 may have an warning signal control 62, such as a volume and/or pulse rate control, with which the intensity and/or pulse rate and/or other characteristics of the warning signal 54 can be adjusted, such as by being adjusted to meet the desires of a particular user. For example, a user may use the warning signal control 62 to make an audible signal be provided at a higher or lesser volume, and/or make a vibration signal to be stronger or weaker, and/or make a repetition rate to be faster or slower or that the signal be steady (non-pulsed). The warning signal control 62 may also, or alternatively, permit the user to select between any of the different types of warning signals of embodiments of the invention, such as selecting between an audible signal vs. a vibration signal, and/or selecting between various combinations of the signals herein, etc.

Depending on the particular embodiment, the proximity detection component 50 and/or warning component 52 may be a part of a hand component 12 and/or a head/face component 14. For example, in one embodiment, a proximity detection component 50 and warning component 52 are part of a hand component 12. In another embodiment, a proximity detection component 50 and warning component 52 are part of a head/face component 14. In some embodiments, proximity detection components 50 may be present on, and/or have shared elements between, both a hand component 12 and a head/face component 14. In some embodiments, warning components 52 may be present on, and/or have shared elements between, both a hand component 12 and a head/face component 14.

Figure 5A:
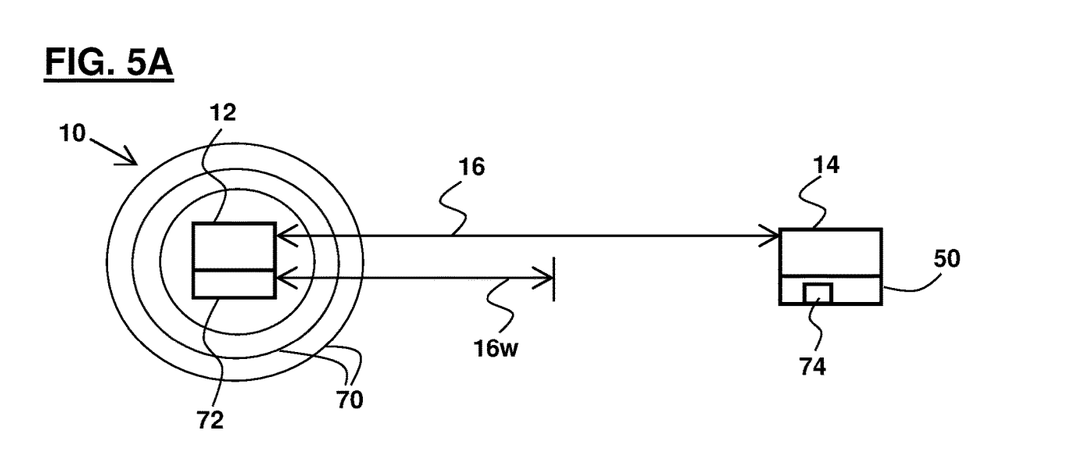
FIGS. 5A-5C depict schematic views of components of hand-to-face warning systems according to embodiments of the invention.

Systems of the invention may use various approaches for determining the distance(s) between hand components and head/face components. For example, as depicted in FIG. 5A, a system 10 may have a hand component 12 that may be configured to generate a magnetic field 70 therearound (e.g., via a permanent and/or electrical magnet 72), with a head/face component 14 comprising a proximity detection component 50 with a magnetic field detector 74. The magnetic field 70 is stronger closer to the hand component 12, so that the strength of the magnetic field 70 as detected by the magnetic field detector 74 will grow as the hand component 12 is brought closer to the head/face component 14. The proximity detection component 50 can be configured such that it activates a warning component when the magnetic field detector 74 detects a magnetic field strength corresponding to the hand component 12 and its magnet 72 being brought within the selected warning distance 16w of the head/face component 14. Note that the positions of the magnet 72 and of the magnetic field detector 74 can be reversed, with the head/face component 14 generating the magnetic field 70 (e.g., via permanent or electro magnet 72), and with the magnetic field detector 74 and proximity detection component 50 being part of the hand component 12.

Figure 5B:
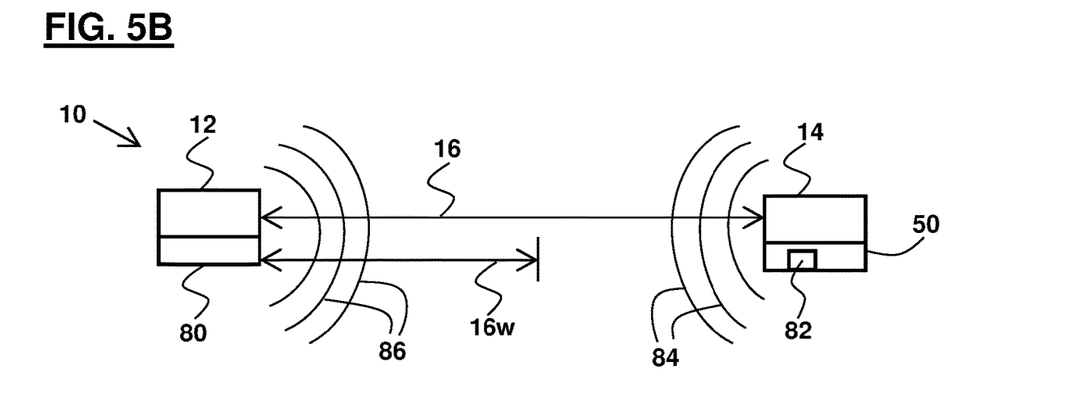

One component such as the hand component may have an active element which emits a signal such as an IR or acoustic signal, and the other component such as a head/face component may have a passive element which provides a return signal, such as a reflected or other return signal (potentially in modified form). For example, an RFID chip can be used which can provide a responsive signal, with changes in intensity of the responsive signal being used by the proximity detection element to determine distances between hand element and head/face element. Another example of a system 10 is depicted in FIG. 5B, where a hand component 12 may comprise a selected metal 80, with a head/face component 14 comprising a metal detector 82 adapted to detect the selected metal 80. For example, the metal detector 82 may emit a signal 84 which causes the selected metal 80 to create a return signal 86 and/or responsive field (e.g., in the form of a phase response created by the selected metal 80 in response to being targeted by the original signal 84). The metal detector 82 may be adapted to detect the particular return signal 86 and/or responsive field of the particular selected metal 80 of the hand component 12. The return signal 86 is stronger closer to the hand component 12, so that the strength of the return signal 86 and/or responsive field as detected by the metal detector 82 will grow as the hand component 12 is brought closer to the head/face component 14. The proximity detection component 50 can be configured such that it activates the warning component 52 when the metal detector 82 detects a return signal 86 and/or responsive field (e.g., phase response) of sufficient strength that corresponds to the selected metal 80 of the hand component 12 being brought within the selected warning distance 16w of the head/face component 14. Note that the positions of the selected metal 80 and metal detector 82 can be reversed, with the head/face component 14 comprising the selected metal 80, and with the metal detector 82 of the proximity detection component 50 being part of the hand component 14.

Figure 5C:
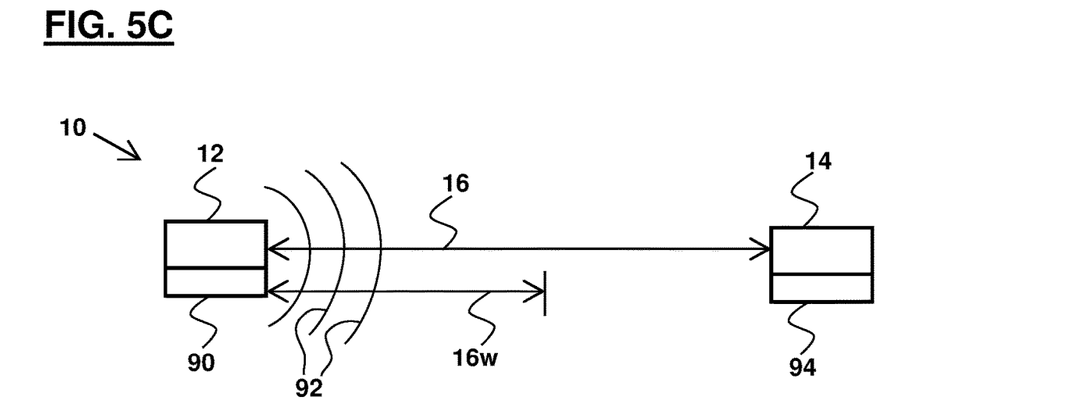

One component such as the hand component may have an active transmitter which emits a signal such as an IR or acoustic signal, and the other component such as a head/face component may have an active receiver which receives the signal and processes the signal to determine the distance between the components. For example, in a system 10 such as depicted in FIG. 5C, a hand component 12 may comprise a transmitter 90, such as an RF generator, which generates a signal 92. The head/face component 14 can comprise a signal detector/receiver 94 adapted to detect the generated signal 92. The generated signal 92 may have different characteristics when the components 12, 14 are at different distances 16. For example, the generated signal 92 may be received at greater strength by the signal detector/receiver 94 when the hand component 12 is closer to the head/face component 14, so that the strength of the generated signal 92 as detected by the signal receiver/detector 94 will grow as the hand component 12 is brought closer to the head/face component 14. The proximity detection component 50 can be configured such that it activates the warning component 52 when the signal receiver/detector 94 detects a signal 92 at a sufficient strength that corresponds to the signal transmitter 90 of the hand component 12 being brought within the selected warning distance 16w of the head/face component 14 and signal receiver/detector 94. Note that the positions of the signal transmitter 90 and signal receiver/detector 94 can be reversed, with the head/face component 14 comprising the signal transmitter 90, and with the signal receiver/detector 94 of the proximity detection component 50 being part of the hand component 12. Moreover, signal transmitters 90 and/or signal receiver/detectors 94 can be part of multiple components of systems of the invention. For example, a system may have multiple hand components 12 which may all have signal transmitters 90; and/or may have multiple head/face components 14 which may all have signal transmitters 90; and/or may have one or more hand components 12 which have signal transmitters 90 as well as having one or more head/face components 14 which have signal transmitters 90. Such a system may have multiple hand components 12 which may all have signal receivers/detectors 94; and/or may have multiple head/face components 14 which may all have signal receivers/detectors 94; and/or may have one or more hand components 12 which have signal receivers/detectors 94 as well as having one or more head/face components 14 which have signal receivers/detectors 94.

Various combinations and numbers of hand components and head/face components can be used. For example, in the particular system 10 depicted in FIG. 6, there are two hand components 12L, 12R and two head/face components 14L, 14R. Each hand component 12L, 12R may be adapted to be secured to a user at or adjacent the user's hand, such as to the right and left hands of the user. Each head/face component 14L, 14R may be adapted to be secured to or adjacent a head (e.g., face) of a user, such as to the right and left sides of the head (e.g., face) of the user. The hand components 12L, 12R are separated from the head components 14L, 14R by distances 16a, 16b, 16c, 16d. As a user moves his/her hands around, the distances 16a, 16b, 16c, 16d will vary. If one, two, or any other combination of the distances 16a, 16b, 16c, 16d falls to or below the warning distance 16w, the system 10 will activate the warning signal.

Figure 6:
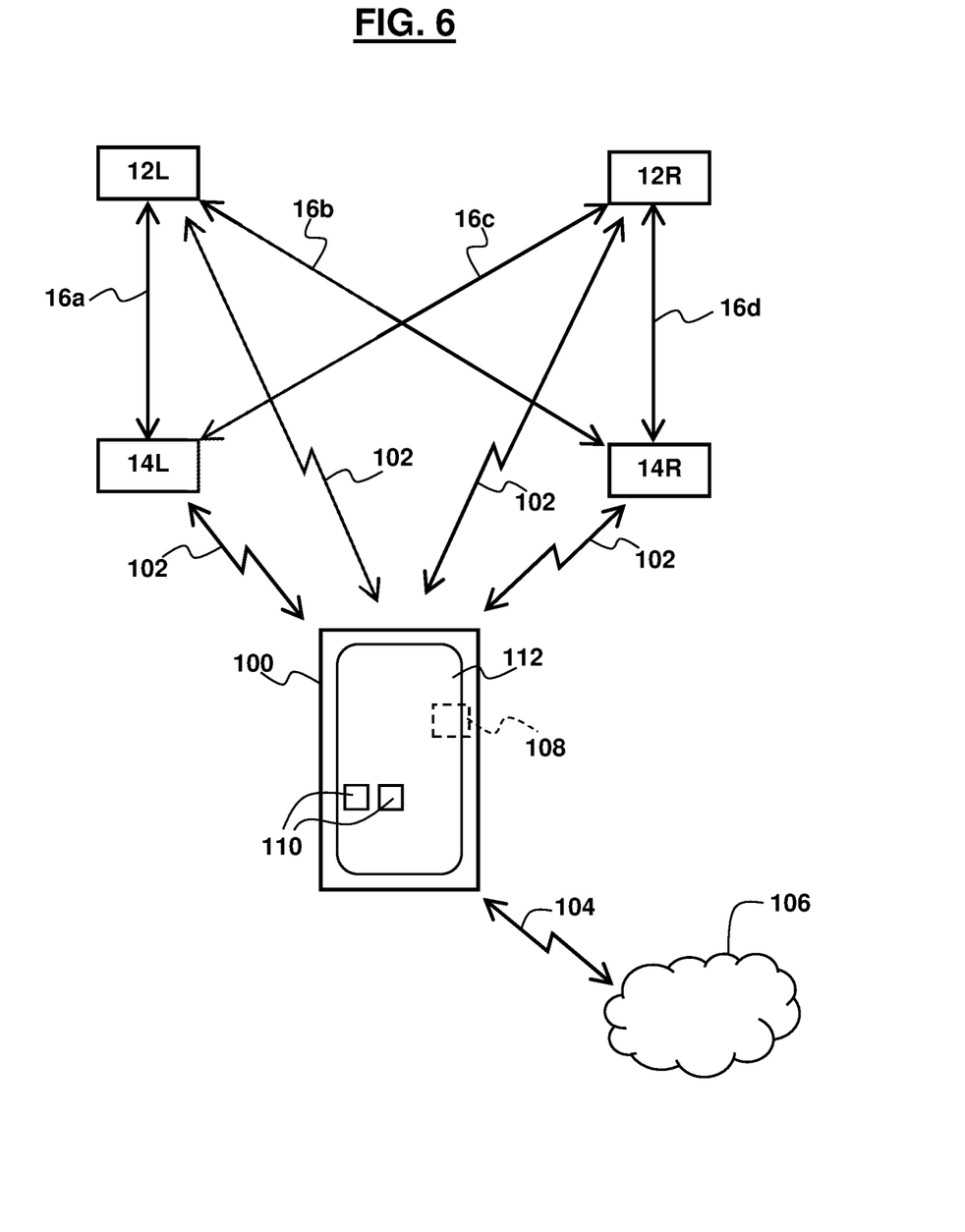
FIG. 6 depicts a schematic view of components of a hand-to-face warning system according to an embodiment of the invention.

Note that different components (e.g., the hand components 12L, 12R and/or the head components 14L, 14R) of any system of this invention may provide individually specific signals, so that the system can recognize which hand (i.e., right or left) is being brought toward the face, and/or can recognize which side of the face or head (i.e., right or left) a hand is approaching, and/or can identify any or all or any combination of the distances, such as the distance 16a, 16b, 16c, 16d.

Any systems of the invention disclosed herein may incorporate smartphone technology, such as where one or more of the hand elements or head/face elements, e.g., the hand components 12L, 12R and/or the head components 14L, 14R, have communication links 102 with a smartphone 100, such as via Bluetooth or other communication methods. The smartphone 100 may have wireless connection(s) 104 via cellular/wireless technology/systems to the internet 106 and/or cloud and/or other external networks. Such a smartphone-enable system may involve providing a specific app 108 on the smartphone 100. The smartphone 100 may be adapted, such as via the app 108, to determine distances (e.g., 16a, 16b, 16c, 16d) between any or all hand components and/or head/face components, to provide warnings regarding hand-to-head/face distances/proximity, and/or to record and provide feedback of and regarding hand-to-head/face proximities based on information/signals from any or all hand components and/or head/face components. A user can use the smartphone 100 to select various settings of a system, including turning the system on and off; settings of the desired warnings (e.g., selection of warning types and settings of intensities/pulse rates); and for setting/resetting the desired warning distance(s). Such selection of system settings using the smartphone 100 can be accomplished via the app 108, and/or using controls 110 which may be provided on the screen 112 of the smartphone 100.

Systems of the invention may incorporate location technology, such as GPS technology using the user's smartphone 100, which may be used to turn the system on and off; vary the settings of the desired warnings (e.g., selection of warning types and settings of intensities/pulse rates); and for varying the desired warning distance(s) based on the user's location. For example, when the system 10 via the smartphone 100 determines that the user is at the user's home or another designated low-risk-of-infection location, the system 10, such as via the smartphone 100 and/or app 108, may be adapted to be automatically turned off, to change the warnings (including turning the warnings off), and/or to shorten the warning distances. Such a system 10 may be adapted to return to turn back on, to change the warnings (including turning the warnings back on and/or increase the warnings intensity/volume/pulse rates), and/or to lengthen the warning distances when the system 10 determines, such as via the smartphone 100, that the user has left the user's residence or other designated low-risk-of-infection location. As another example, the system 10 may be adapted to provide more rigorous signals when the user is determined to be in a public or other higher-risk-for-infection location, such as being in a grocery store or theater. Determining the risk-of-infection for various locations may be set by the user, and/or may be provided via the app such as by using online/internet/wireless and/or GPS information and/or based on the type of facility of the location. For example, the system 10 via the app 108 may designate all grocery stores and other stores as high-risk, and/or set hospitals and/or doctors' offices as extremely high risk. The system 10 via the app 108 may designate areas with high densities of people as high risk, and areas with low densities of people as low risk. The system 10 such as via the smartphone 100 and app 108 may be adapted to provide the user the opportunity to set or change the risk setting of different locations or regions, such as where a user sets a specific location/address or region or type of business as low risk or medium risk or high risk. For example, a user can set the specific risk of his/her home address, and/or can set various relatives or acquaintances homes (such as homes of relatives or acquaintances known to be healthy and/or unlikely to be infected) as low risk, and/or can set other specific relatives or acquaintances homes (such as homes of relatives or acquaintances known to be ill or likely to be infected) as high risk. As the user receives additional information about any location, such as reports of infection at that location, the user can change the specific risk setting for that location.

The system 10 such as via the app 108 may actively change risk settings for different locations. For example, a system 10 may be adapted, such as via a smartphone 100 and/or wireless connection 104 and/or internet 106, to monitor infection reports for specific locations and/or regions, and to provide appropriate risk updates for such specific locations and regions, such as where an outbreak of infection is reported in a specific location or geographical area. The system 10 may correspondingly increase or decrease the risk settings for such specific locations and/or for locations within a specific geographical area. For example, the system 10 may be adapted to access information from health-related organizations, such as local and national health organizations which track infection outbreaks and provide location-based and/or region-based data regarding infection rates, and to make corresponding updates/changes to risk settings for various locations and regions based on the information provided by the health-related organization. The system 10 may also provide a specific risk-based signal when a user is determined to be entering a higher or lower risk area. For example, when the system 10 (such as using the smartphone 100 and/or app 108 and/or GPS) determines the user to be entering a high-risk area such as a hospital, the system 10 may be adapted to provide a specific change-of-risk warning signal, such as an audible signal (e.g., an audible tone or a word announcement of "higher risk") and/or pulsed vibration and/or other signal (e.g., audible, visual, vibration) provided by the smartphone 10 and/or by any hand element(s) or head/face element(s) (such as the elements 12L, 12R, 14L, 14R), which warns the user of the change in risk.

Note that any and all dimensions listed are by way of example, and devices according to the invention may have dimensions outside those specific values and ranges.

Unless otherwise noted, all technical and scientific terms used herein have the same meaning as commonly understood by one of ordinary skill in the art to which this disclosure belongs. In order to facilitate review of the various embodiments of the disclosure, the following explanation of terms is provided:

The singular terms "a", "an", and "the" include plural referents unless context clearly indicates otherwise. The term "or" refers to a single element of stated alternative elements or a combination of two or more elements, unless context clearly indicates otherwise.

The term "includes" means "comprises". For example, a device that includes or comprises A and B contains A and B, but may optionally contain C or other components other than A and B. Moreover, a device that includes or comprises A or B may contain A or B or A and B, and optionally one or more other components, such as C.

Although methods and materials similar or equivalent to those described herein can be used in the practice or testing of the present disclosure, suitable methods and materials are described below. In case of conflict, the present specification, including terms, will control. In addition, the materials, methods, and examples are illustrative only and not intended to be limiting.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

What is claimed is:

1. A system for training a user to avoid hand-to-face contact, comprising:
    a first hand element adapted to be secured to a hand of the user;
    a first head element adapted to be secured to a head of the user;
    a smartphone comprising an app, wherein the smartphone is adapted via the app to determine if the first hand element is within a first selected distance of the first head element, wherein the smartphone is further adapted via the app to provide a warning signal responsive to determining that the first hand element is within the first selected distance of the first head element; and
    wherein the smartphone is adapted to determine a location of the user, and wherein the smartphone is adapted, via the app, to increase or decrease the first selected distance based on the location of the user.

2. The system of claim 1, wherein the smartphone is adapted, via the app, to modify the warning signal based on the location of the user.

3. The system of claim 1, wherein the smartphone is adapted, via the app, to determine a risk-of-infection value based on the location of the user.

4. The system of claim 3, wherein the smartphone is adapted, via the app, to allow the user to set a desired risk-of-infection value for one or more specific locations.

5. A method of preventing a user from touching one or both hands of the user to a head of the user, comprising:
    providing a first hand element adapted to be secured to a hand of the user;
    providing a first head element adapted to be secured to a head of the user;
    providing a smartphone comprising an app, wherein the smartphone is adapted via the app to determine if the first hand element is within a first selected distance of the first head element, wherein the smartphone is further adapted via the app to provide a warning signal responsive to the first hand element being within the first selected distance of the first head element;
    positioning the first hand element on or adjacent a first hand of the user;
    positioning the first head element on or adjacent the head of the user;
    determining if the first hand element is within the first selected distance from the first head element;
    if the first hand element is within the selected distance from the first head element, providing the warning signal; and
    wherein the smartphone is adapted to determine a location of the user, the method further comprising:
    determining the location of the user using the smartphone;
    increasing or decreasing, via the app, the first selected distance based on the location of the user.

6. The method of claim 5, further comprising:
    modifying the warning signal via the app based on the location of the user.

7. The method of claim 5, further comprising:
    modifying the first selected distance or the warning signal via the app based on the time of day.

8. The method of claim 5, further comprising:
    determining a risk-of-infection value via the app based on the location of the user; and
    modifying the first selected distance or the warning signal via the app based on the risk-of-infection value.

* * * * *